Patented Jan. 31, 1933

1,895,955

UNITED STATES PATENT OFFICE

LEON WYGODSKY, OF BALTIMORE, MARYLAND

SOLID FUEL AND PROCESS OF MAKING THE SAME

No Drawing. Application filed September 20, 1928. Serial No. 307,337.

The general object of my invention is the provision of a solid fuel non-alcoholic, non-poisonous and stable, which will burn without smoke, odor or residue, and which will be easy to use.

A further object of my invention is the process of shaping a solid fuel and putting the same into the form preferable to be used.

With the foregoing and other objects in view, my invention consists of the methods employed, combination and arrangement of systems and means as hereinafter specifically provided, wherein is shown the preferred embodiment of my invention, but it is understood that changes, variations and modifications may be resorted to which come within the scope of the claims hereunto appended.

I have discovered that hexamethylentetramine, having the general chemical formula $C_6H_{12}N_4$, is the preferred one of a number of substances, suitable for my invention; in fact, preferable to a number which I have tried, among which I might mention metaldehyde $(C_2H_4O)_4$ which I may nevertheless use in some instances.

This invention has primarily to do with my co-pending application, filed May 11, 1928, and given Serial No. 277,004, for food appliance, the subject of this application being the preparation or method of making a fuel particularly adapted for said appliance though not limited to use therewith or therein.

I have also discovered that this material hexamethylentetramine may be compacted by a very simple process by converting the same into a plastic form by mixing the pulverized material with sufficient liquid to make the same into a paste. I have found that water, alcohol, ether, benzine and other liquids are suitable for this purpose. Furthermore they may be either a solvent, or non-solvent of the hexamethylentetramine. The plastic mass may be molded into any desired shape, or filled into any desirable container or capsule, according to the purpose for which it is to be used. This plastic material has the property of solidifying when the liquid solvent or vehicle is driven off in any known manner.

Among the discoveries involved in my invention, are the following:

1. That the hexamethylentetramine can be transformed into a coherent form, or mass.
2. That when so transformed it will be sufficiently stable and self-sustaining physically and chemically for ordinary handling as a heating element.
3. That when it is brought into contact with the flame of a match it ignites on the surface and thereafter burns steadily and uniformly.
4. That it is sufficiently stable to prevent the whole mass from coming into reaction at once.
5. That the products of combustion are not objectionable.
6. That it burns without melting and without leaving a residue.
7. That when it is formed by plastic molding it is more easily ignited than when it is in its original state.

I have used the term "capsule" in this specification in its broadest sense, by which I mean a container into which the material may be compacted, pressed, molded or placed, and it may consist of a metal, or non-metallic, substance, either rigid or non-rigid, and may be of any desired shape, either open, or of one material with a covering of another material. In the latter instance, I have found a covering of varnish, such as collodion, to be very satisfactory. In this application, I am not setting forth any details of capsule, as that is the subject matter of another application.

The hexamethylentetramine burns readily if un-associated with other substances; but I have further discovered that hexamethylentetramine is of slow ignition and that metaldehyde is of quick ignition. I have further discovered that a mixture of these two chemicals will form a burning material, but preferably coating the hexamethylentetramine with a coating of metaldehyde gives an easily ignited and slow burning fuel; one disadvantage being, however, that metaldehyde has a disagreeable odor, whereas, hexamethylentetramine is substantially odorless before and during burning, a most desirable feature when used around food products and in storage. Only in extreme cases where easy ignition is desired and no storage of food products is maintained in the immediate vicinity, would the coated fuel be used.

Having thus described my invention, what I claim and desire to secure by Letters Patent is:

1. The method of making a solid fuel comprising mixing hexamethylentetramine to form a plastic mass, molding the mass and applying a coating thereto.

2. The method of making a solid fuel comprising mixing pulverized hexamethylentetramine with a volatile liquid to form a plastic mass, molding the mass, evaporating out the liquid and applying thereto a coating of more readily ignitable material.

3. The method of making a solid fuel comprising mixing pulverized hexamethylentetramine with a liquid to form a plastic mass, molding the mass, and applying thereto a coating of metaldehyde.

4. A solid fuel comprising a hardened cake of initially plastic hexamethylentetramine containing, in final form, no admixture of extraneous substances.

5. A solid fuel comprising a cake of hexamethylentetramine having a coating thereon.

6. A solid fuel comprising a cake of hexamethylentetramine provided with a coating of more easily ignitable material.

7. A solid fuel comprising a solidified mass of hexamethylentetramine having a coating of metaldehyde thereon.

8. A solid fuel comprising a solid mass of hexamethylentetramine enclosed within an envelope of combustible material.

LEON WYGODSKY.